Oct. 24, 1967  J. W. FAIR  3,349,204
THERMAL OVERLOAD MECHANISM FOR CONTACTOR-OPERATED
MOTOR STARTERS
Filed March 11, 1965
5 Sheets-Sheet 1

Inventor
John William Fair
By Lucke o Lucke
Attorney

Inventor
John William Fair
By Lucke & Lucke
Attorney

Oct. 24, 1967

J. W. FAIR 3,349,204

THERMAL OVERLOAD MECHANISM FOR CONTACTOR-OPERATED MOTOR STARTERS

Filed March 11, 1965

Inventor
John William Fair
By Lucke+Lucke
Attorney

United States Patent Office 3,349,204
Patented Oct. 24, 1967

---

3,349,204
THERMAL OVERLOAD MECHANISM FOR CONTACTOR-OPERATED MOTOR STARTERS
John William Fair, Walsall, England, assignor to J. A. Crabtree & Co., Limited, Walsall, England, a British company
Filed Mar. 11, 1965, Ser. No. 439,034
Claims priority, application Great Britain, Mar. 16, 1964, 10,930/64
8 Claims. (Cl. 200—116)

This invention is an improvement on the thermal overload devices and trip mechanism operated thereby for contactor-operated motor starters disclosed in Patent No. 2,565,467. In particular, it is concerned with mechanism adapted to be tripped by thermally sensitive overload elements in the event of overload in the windings of a three-phase motor, such elements being uniformly distorted to cause tripping of the mechanism after a predetermined interval on the occurrence of a balanced and sustained overload in each of the protected phases, while causing the mechanism to be tripped and the circuit opened without a time interval of this order, on the occurrence of an unbalanced overload or the condition known as single phasing. The invention is particularly concerned with arrangements in which the three thermal overloads are disposed in a row in an insulating box. In such arrangement the middle device is liable to be at a uniformly higher temperature than the two other devices due to its disposition between them and the consequent restrictions on the conduction of heat therefrom.

The principal object of the present invention is to provide efficient differential action of the overloads on single phasing by ensuring approximately equal heating of the three overload devices. A further object is to provide a simple trip mechanism in which frictional losses are reduced to a minimum in order to ensure reliably operating mechanism.

According to this invention the middle chamber or cell of the overload box is provided with ventilating openings for the passage of air through the chamber in order to achieve an approximately equal temperature in the three chambers. Compensation is thereby provided for the conduction of heat from the outer chambers to the middle chamber and the disposition of the latter over the coil of the contactor. The openings may be provided by a slot or aperture in the lower part of the front wall and in the floor of the chamber for entry of air, the outlet of which takes place through openings located in the cover of the box. Further compensation for any higher temperature in the middle chamber may be corrected by enlarging those slots in the trip bars with which the end of the middle bimetal element engages, thereby necessitating the deflection of such bimetal to a greater extent than the other bimetals, before effectively engaging the trip bars.

The trip bars may be coupled by a triangular lever or bell crank, having a roller for actuating a trip lever which may pivot on a knife edge bearing, such means enabling frictional losses to be reduced.

In order to enable the invention to be readily understood reference will now be made to the accompanying drawings illustrating by way of example different arrangements for carrying the invention into effect, in which drawings.

Figure 2:
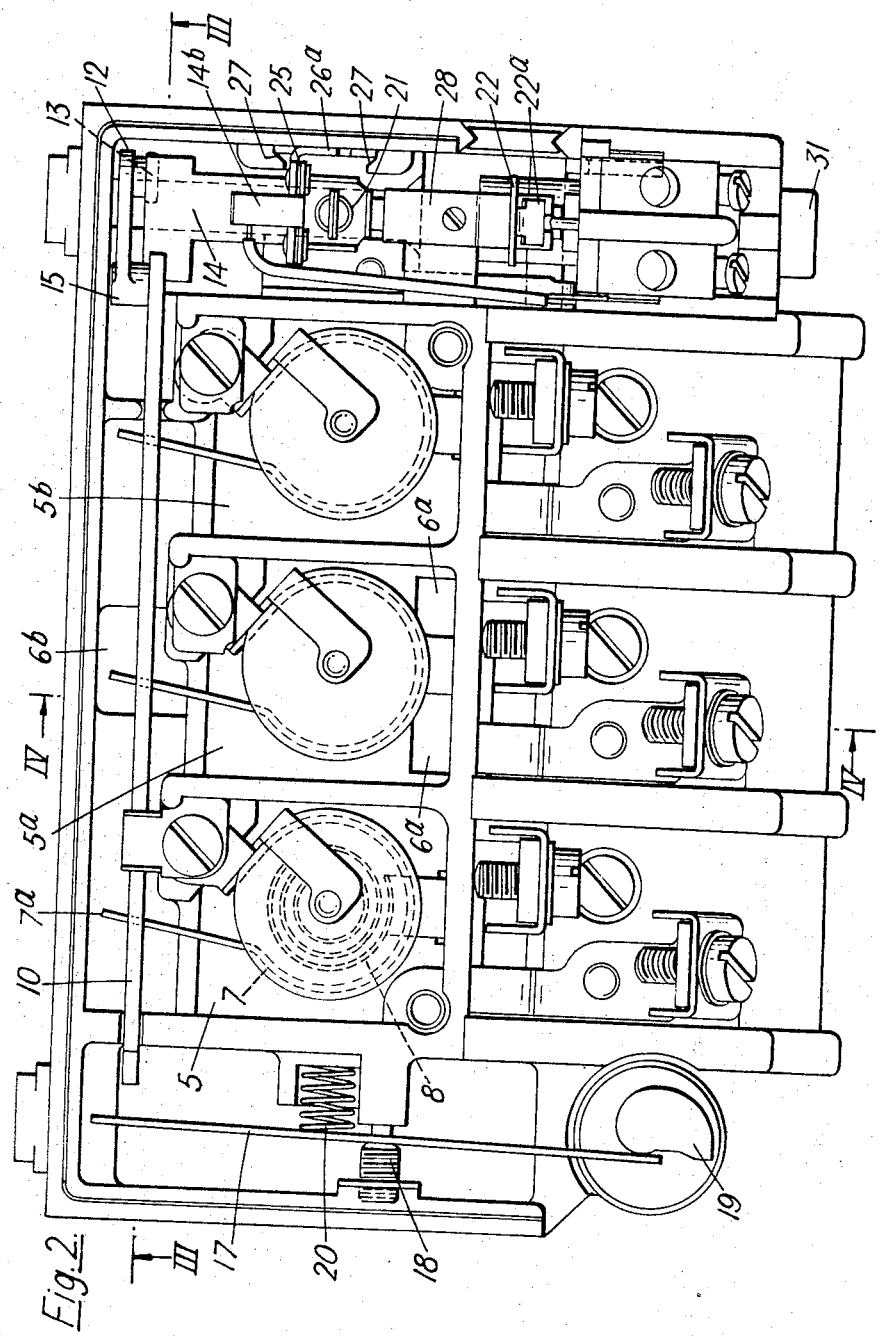
FIGURE 2 is a plan of the overload box to a larger scale with the top cover removed.

Referring to the drawings the switch, as fully described in the above stated patent, comprises an armature traverse 1 horizontally slidable between upper and lower boxes 2 and 3 on which are mounted fixed contacts 4 co-operating with moving contact bridges 4$^a$ carried by the traverse supported on pivotal means (not shown), in the lower box 3. As seen in FIG. 2, the upper box 2 containing the overload devices has three chambers 5, 5$^a$ and 5$^b$. The two outside and middle or center chambers each containing a part-cylindrical bimetal element 7, enclosing a heater 8.

Figure 1:
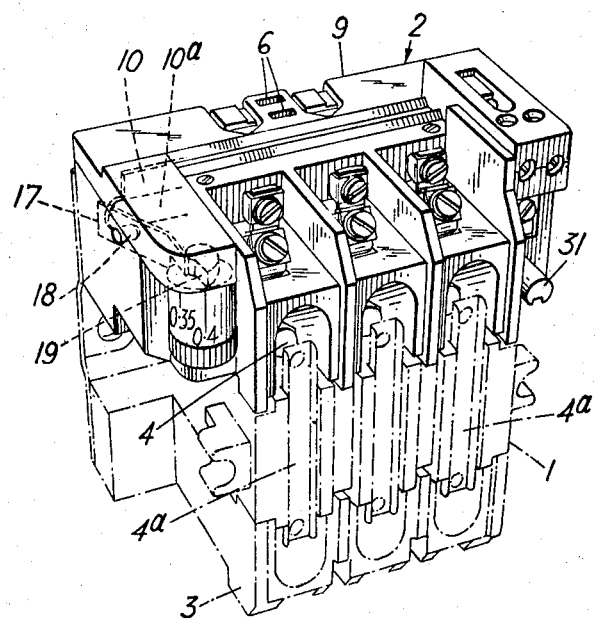
FIGURE 1 is a perspective view of a motor starting switch, the overload box being shown in full lines and the lower box and armature traverse being in chain lines.
Figure 4:
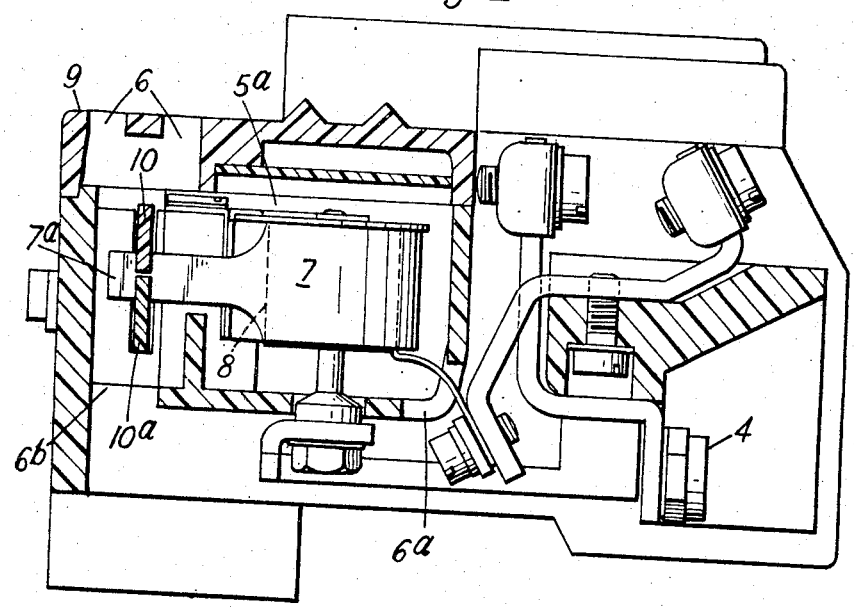
FIGURE 4 is a section on the line IV—IV of FIGURE 2.

According to the present invention the middle chamber or cell 5$^a$ of the upper box 2 is provided with ventilating openings 6, 6$^a$, 6$^b$, for the continuous passage of natural convective air currents through the chamber during operation of the mechanism, in order to achieve an approximately equal temperature in the three chambers. There is a rectangular opening 6$^a$ at the bottom and front of the middle chamber adjacent each front corner, as shown in FIGURES 2 and 4. The bottom and rear of this chamber has a similar entry opening 6$^b$. The air in the middle chamber, rapidly expanding when heated due to its decreased density, rises and escapes through the top openings 6 in the cover. This action draws a continual intake of cooler air into the lower openings. At the same time, the greater pressure of the outer, denser air forces its way into the chamber via lower openings 6$^a$, 6$^b$. These two natural forces set up continuous convective currents of air which equalize the temperature in the middle chamber with that of the two outside, unventilated chambers. The cover 9 of the box is formed, above the middle chamber, with a pair of slotted outlets 6 (FIGURES 1 and 4) disposed one in front of the other for the outlet of air from such chamber.

The straight reduced end 7$^a$ of each bimetal element 7 protrudes into open-ended slots 11, 11$^a$ in a pair of flat insulating trip bars 10, 10$^a$ disposed horizontally one above the other. The middle slot 11$^a$ in the upper bar 10 may be of slightly enlarged width (FIGURE 3) in relation to those for the outer bimetals so that the middle bimetal required to be deflected to a slightly greater extent or travel further before engaging the bar. Thus the temperature in the middle chamber may rise higher than that in the outer chambers before actuation of the trip bars, thereby further ensuring equalization of the effectiveness of the three chambers.

Figure 3:
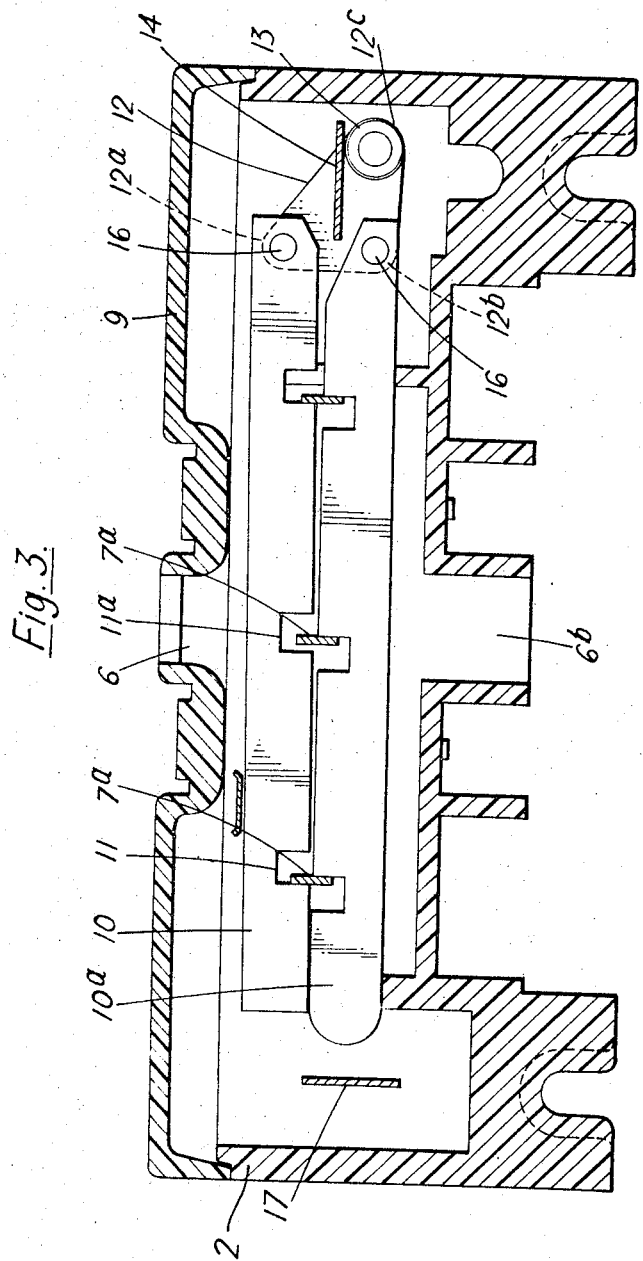
FIGURE 3 is a section on the line III—III of FIGURE 2.
Figure 5:
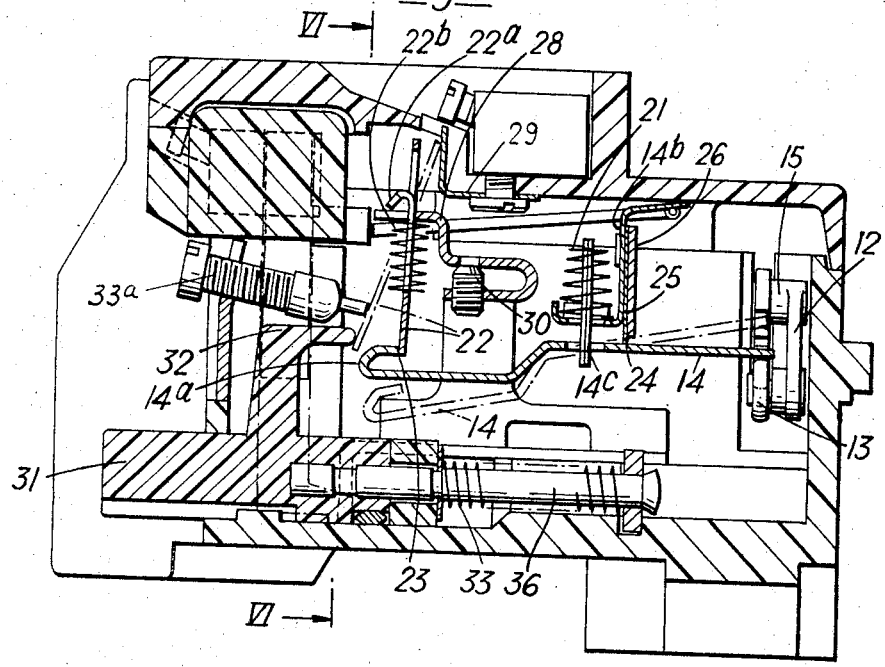
FIGURE 5 is a cross section through the trip mechanism.
Figure 6:
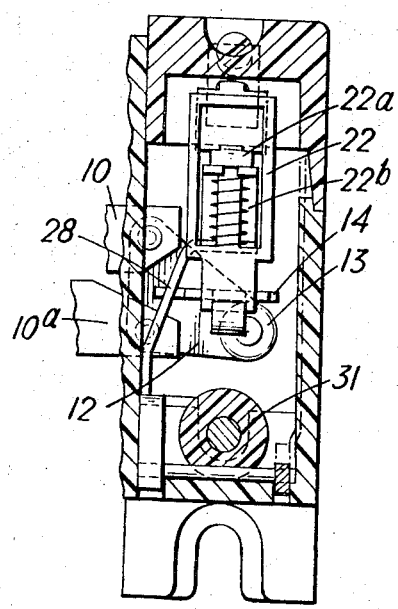
FIGURE 6 is a section on the line VI—VI of FIGURE 5.

In a trip compartment at one end of the box 2, the bars 10, 10$^a$, are coupled by lever member 12 of triangular shape pivoted at two of its corners 12$^a$, 12$^b$ to the bars and being provided at its third corner 12$^c$ with a pivotally mounted roller 13 adapted to engage with the horizontal portion of a trip lever 14, FIGURES 3 and 5. The flat triangular member 12 may be produced as a moulding having on one side face three lateral bosses 15, see FIGS. 2 and 5, one having the roller 13 riveted thereon and the other pair each being apertured for freely receiving a pin 16 on the end of each trip bar. In another compartment at the other end of the box, the trip bars engage an ambient compensating blade 17 as fully described in Patent No. 2,606,062. The blade is pivotally mounted between its ends on a stud 18 and engaged at its end remote from the bars by a cam 19 which is manually adjustable against the action of a spring 20.

The lever 14 is pivotal about a knife edge mounting 24 between its ends, this mounting being provided for example by the edge of a thin blade 25 secured to a fixed bracket 26, having a bent arm 26ᵃ entering in grooves 27 in the end trip compartment of the box. The lever is urged into engagement with the roller 13 by a compression spring 21 disposed around an I-shaped stem 14ᶜ which extends through an aperture in the lever 14 and has its lower flanges engaging the sides of the latter. The spring bears at its upper end against the top flanges of the stem 14ᶜ. The lower end of the spring is seated on a member 14ᵇ secured to the fixed bracket 26. The end 23 of a hook formation 14ᵃ on the lever 14 is engaged by the lower end of a swinging arm 22 which is formed with a bent portion 22ᵃ pivotally bearing on a second bracket 28. A compression spring 22ᵇ causes the arm to swing out of engagement with the hook 14ᵃ when the lever 14 is depressed due to the pivotal action of the roller. The parts occupy the position shown in chain lines, FIGURE 5, after a tripping operation. The circuit is thereby broken at the hook and the other end of the arm 22 engages a contact plate 29 to make an alarm circuit in known manner.

The degree of engagement of the arm with the hooked end of the lever 14 may be adjusted by manipulation of a setting screw 30 which causes the free end of the bracket to be moved slightly so as to provide for a fine adjustment of the arm in relation to the lever 14.

The moulded knob 31 of a reset button or plunger 36 for hand re-setting after tripping, is provided with a projection 32 which acts on the arm 22 to return it into engagement with the hooked end of the lever 14 provided the bimetals 7 have cooled sufficiently to permit the lever to return to its normal position. The plunger is actuated against the action of a spring 33. For automatic re-setting a screw 33ᵃ is adjusted inwards in order to restrict the movement of the swinging arm 22. In normal conditions the lever engages the lower end of the arm in order to complete the circuit without catch engagement.

With balanced overloads the deflection of the bimetals causes the roller 13 to be moved in a direction parallel to the trip bars 10, 10ᵃ, until the abutment of the lower one 10ᵃ with the ambient blade 17, whereupon the upper bar 10 moves forwardly to cause the triangular plate 12 to turn about its lower pivot 16 in corner 12ᵇ and operate the trip lever 14.

With unbalanced overloads, the cool bimetal produces a movement of the lower bar 10ᵃ away from the ambient blade 17 so that the triangular plate 12 is turned about its upper pivot 16 in corner 12ᵃ to operate the trip lever. In the case of absence of current in one phase and two active bimetals, the cold bimetal holds the lower bar 10ᵃ and the plate 12 is turned about its upper pivot 16 as with unbalanced overload conditions.

Figure 7:
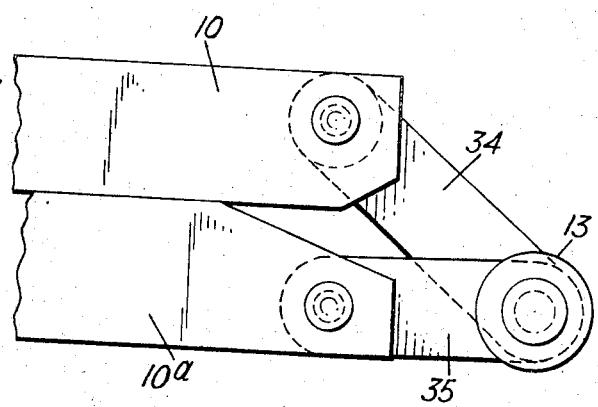
FIGURE 7 is a side elevation.
Figure 8:
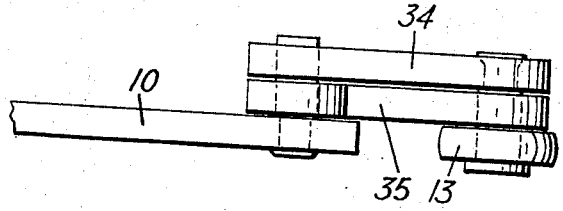
FIGURE 8 is a plan of part of a modified form of trip bar.

According to the modified arrangement shown in FIGURES 7 and 8, links 34, 35, are each pivotally connected to the end of a trip bar 10, 10ᵃ, and to each other by pins on the outermost of which is mounted a roller 13 for actuating the trip lever 14.

It is known that heat such as supplied by heaters 8 is necessary for operation of the bimetal elements 7 of the instant overload device and, therefore, any cooling per se of the chambers would prevent the proper function of the device. As stated previously, the diverse structural elements of middle chamber 5ᵃ, i.e., ventilating slots 6ᵃ, 6ᵇ, exhaust slots 6 and wider slots 11ᵃ, are constructed solely to achieve heat equalisation of the temperature in the middle chamber with that of the two outer chambers 5, 5ᵇ.

The forms of the invention here described and illustrated are presented merely as examples of how the invention may be embodied and applied. Other forms, embodiments and applications of the invention, coming within the proper scope of the appended claims, will of course suggest themselves to those skilled in the art.

Having thus described my invention, I claim:

1. An overload box for a motor starting switch (1), said box (2) comprising front, rear and side walls, and a cover (9) seatable on the top of said walls to close said box, said box enclosing two elongated compartments and three similarly proportioned juxtaposed chambers disposed therebetween, each of said chambers having a floor and consisting of two closed outer chambers (5, 5ᵇ) and an apertured middle chamber (5ᵃ), said middle chamber provided with a first ventilation opening (6ᵃ) disposed in the front portion of its respective floor and front wall, and a second ventilating opening (6ᵇ) disposed in the rear portion of its respective floor, a bimetal element (7) disposed in each of said chambers, said cover provided with at least one exhaust opening (6), whereby a continuous passage of natural convective air currents entering through said ventilating openings flow upwardly in said middle chamber and escape through said exhaust opening to reduce the increased heat generated therein and substantially equalize the temperature in all of said three chambers.

2. An overload box according to claim 1, in which said exhaust opening is disposed directly above one of said ventilating openings.

3. An overload box according to claim 2, including a first trip bar (10ᵃ) and a second trip bar (10), said first bar disposed horizontally beneath said second bar, each of said bimetal elements engaging said bars, an ambient temperature compensating means (17) mounted in one of said compartments, said means being engageable with one end of said first bar (10ᵃ), trip mechanism disposed in the other of said compartments, said mechanism comprising lever means (12, 34, 35) coupling the other end of said first bar to said second bar, a roller (13) disposed on one end of said lever means, a trip lever (14), mounting means (14ᵇ, 14ᶜ) for said trip lever disposed substantially intermediate its length, a knife edge (24) disposed between said mounting means and said lever means, said trip lever being pivotal about said edge and actuated by said roller.

4. An overload box 2 according to claim 3, including a hooked end (14ᵃ) disposed on said trip lever (14), screw means (30), a first bracket (28) provided with a U-shaped member, a swinging arm (22) pivotally bearing on said bracket, one end of said swinging arm having catch engagement with said hooked end when the main circuit is closed, said screw means adjustably mounted on one arm of said member and engaging the other arm thereof for varying the contact pressure between said swinging arm and said hooked end.

5. An overload box according to claim 4, including a compression spring (22ᵇ) and an alarm circuit having a terminal bracket (29), said swinging arm comprising a frame (22) with a bent portion (22ᵃ) disposed intermediate the ends thereof, said spring being coiled around said frame below said bent portion to swing said frame away from said hooked end (14ᵃ) when said trip lever (14) is depressed, said bent portion pivotally bearing on said first bracket (28), the lower end of said frame engaging said hooked end when the main circuit is closed, said spring causing the upper end of said frame to engage said terminal bracket (29) and activate said alarm circuit during overload, wherein said trip bars (10, 10ᵃ) turn said lever means and depress said trip lever from said frame to open said main circuit.

6. An overload box according to claim 3, wherein said lever means comprises a triangular lever (12) pivoted at two of its corners (12ᵃ, 12ᵇ) to said trip bars (10ᵃ, 10) and said roller being pivotally mounted in its third corner (12ᶜ).

7. An overload box according to claim 3, wherein said lever means comprises a pair of links (34, 35), pins pivotally connecting one end of each of said link to one of said trip bars and the other end of said links pivotally connected to said roller (13).

8. An overload box according to claim 1, including longitudinal trip bars (10, 10a) extending from one of said compartments to the other and passing through said chambers, said bars providing a pair of slots (11, 11a) in each said chamber, the end (7a) of each of said three bimetal elements (7) entering one of said slots, the slot (11a) engaged by the bimetal in said middle chamber (5a) being larger than said remaining slots (11), wherein said middle bimetal travels further and generates more heat than the bimetals in said outer chambers.

References Cited

UNITED STATES PATENTS

| | | | |
|---|---|---|---|
| 2,429,846 | 10/1947 | Seaman | 200—144 |
| 2,824,939 | 2/1958 | Claybourn et al. | 317—100 |

FOREIGN PATENTS

| | | |
|---|---|---|
| 553,154 | 5/1943 | Great Britain. |
| 856,057 | 12/1960 | Great Britain. |

BERNARD A. GILHEANY, *Primary Examiner.*

H. A. LEWITTER, *Assistant Examiner.*